W. D. NICKUM.
ELECTRODE FOR ELECTRICAL WATER LEVEL INDICATING APPARATUS AND OTHER ELECTRICAL APPARATUS.
APPLICATION FILED OCT. 13, 1919. RENEWED OCT. 29, 1920.
1,398,270.
Patented Nov. 29, 1921.
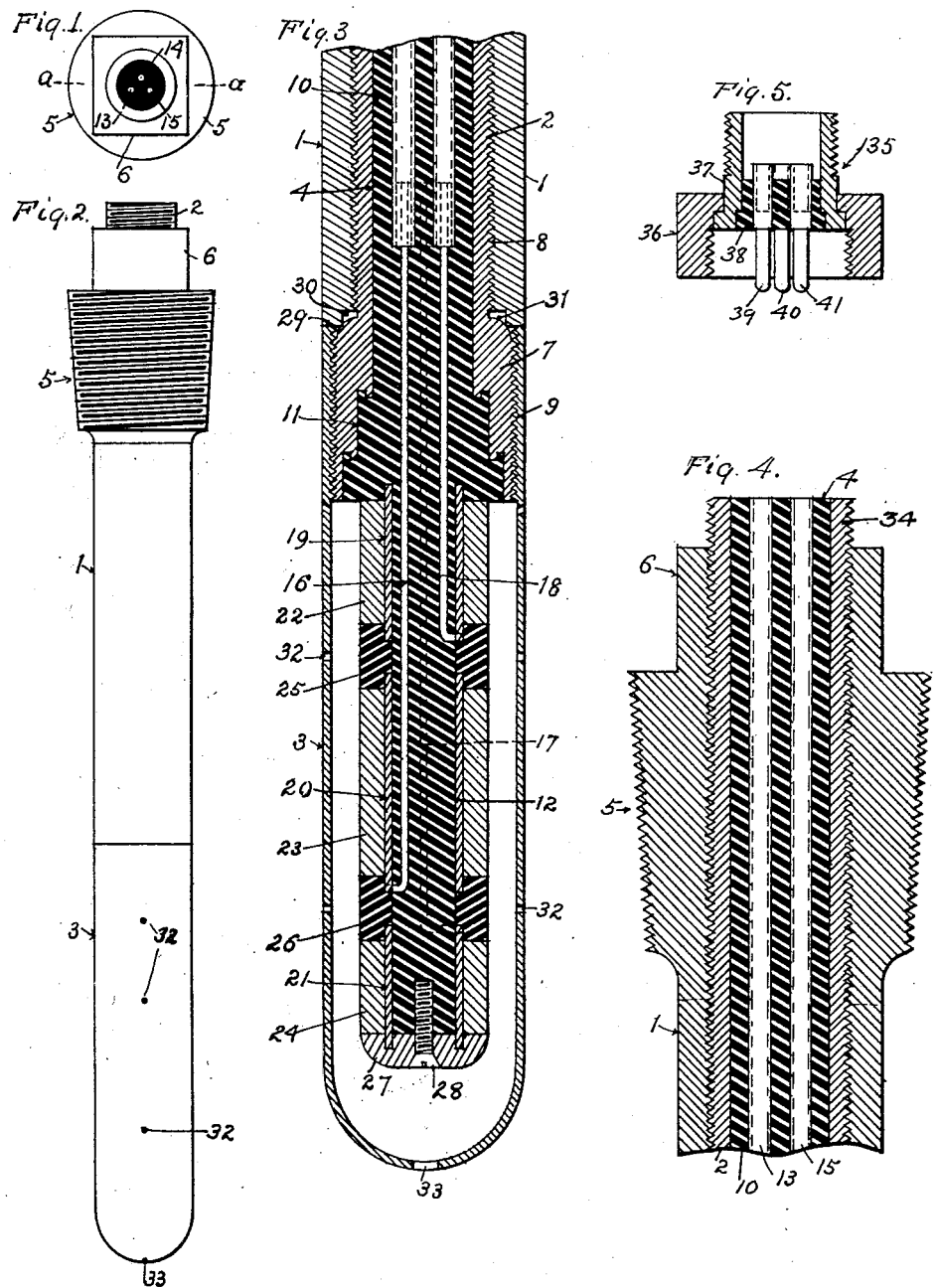
INVENTOR
Walter D. Nickum.
BY
Arthur P. Knight
ATTORNEY

UNITED STATES PATENT OFFICE.

WALTER D. NICKUM, OF GLENDALE, CALIFORNIA.

ELECTRODE FOR ELECTRICAL WATER-LEVEL-INDICATING APPARATUS AND OTHER ELECTRICAL APPARATUS.

1,398,270.    Specification of Letters Patent.    Patented Nov. 29, 1921.

Original application filed September 16, 1918, Serial No. 254,345. Divided and this application filed October 13, 1919, Serial No. 330,392. Renewed October 29, 1920. Serial No. 420,580.

*To all whom it may concern:*

Be it known that I, WALTER D. NICKUM, a citizen of the United States, residing at Glendale, in the county of Los Angeles and State of California, have invented a new and useful Improvement in Electrodes for Electrical Water - Level - Indicating Apparatus and other Electrical Apparatus, of which the following is a specification.

This application is a division of my application Ser. No. 254,345, filed September 16th, 1918.

The main object of the present invention is to provide an improved construction of electrode means for establishing circuit through the water for controlling the operation of electrical water level indicating apparatus.

Other objects of the invention will appear hereinafter.

The accompanying drawings illustrate an embodiment of my invention, and referring thereto:

Figure 1 is an end elevation and Fig. 2 a side elevation of the electrode tube;

Fig. 3 and Fig. 4 are sections on line *a—a* in Fig. 1, respectively at the right and left ends thereof;

Fig. 5 is a longitudinal section of a connection plug for the electrode tube.

My invention constitutes an apparatus designed to integrally contain suitable members for establishing electrical contact with the water in a steam boiler and also containing means for connecting wires thereto, said apparatus being illustrated in Figs. 1 to 4, and referring thereto, the complete tube, Fig. 1, consists of four principal parts or sections, as follows, namely: outer tube 1 (Figs. 1, 2 and 3), having an enlarged head 5 suitably tapered and threaded to engage a tapered threaded hole in the shell of a boiler and having a squared extension 6 to form means whereby a wrench or other tool may be applied when screwing the threaded member 5 in or out of the boiler, said tube 1 having a bore threaded throughout its entire length; a second tube 2 also having an enlarged end or head 7 bored out and channeled, as shown, and having the outer circumference of the shaft portion 8 threaded so as to engage with and screw into the center of tube 1 for its entire length; a shell 3 closed at one end and having a portion of the inner circumference at the open end threaded to engage threads cut on the outer circumference of the head 7 of the tube 2; and a core piece of insulating material 4 consisting of the shaft portion 10 having a length and external diameter equal to the length and internal diameter of the tube 2, an enlarged portion 11 near one end turned and channeled to fit the bored out and channeled head 7 of tube 2 and an extending member 12 from the head 11 of less diameter and length than the shaft 10.

The core rod 4 is composed of bakelite, or other suitable insulating material having great heat resisting and electric insulating qualities and impervious to water. Embedded in the insulating core 4 are the asymmetrically arranged metal tubes 13, 14 and 15, with the connecting wires 16, 17 and 18 securely attached thereto by soldering or other suitable means, (see Fig. 3). On the extended member 12 of core 4 are the metallic tubes, 19, 20 and 21, Fig. 3, electrically connected by soldering or riveting to their respective wires 16, 17 and 18. On the outside of the tubes 19, 20 and 21 and in electrical contact therewith, are the tubes or sleeves 22, 23 and 24 preferably of carbon, or other material not easily decomposed or disintegrated by electrolysis. Between the sets of metal and carbon tubes are the channeled bushings 25 and 26 of similar insulating material to the core 4. The end set of electrodes consisting of metal tube 21 and carbon sleeve 24 is secured by the metal plate 27 held in place by the screw 28 engaging a threaded hole in the end of member 12.

The end 29 of tube 1 facing the head 7 of inner tube 2 is faced off and a shallow recess 30 cut therein leaving a sharp edge on its outer angle. The facing end of the head 7 is turned to a quarter circle 31 so that when the head 7 of tube 2 is screwed up against the channeled end 29 of tube 1 a steam tight ball joint will be formed. A suitable packing may also be placed in channel 30, if necessary. The insulating core 4 has its shaft portion 10 turned to such a size that it will drive into the hollow center of tube 2, while the head 11 is turned and channeled to completely engage the bored out channeled interior of head 7, forming steam tight joints therewith. The shell 3 is of such an external diameter and its threaded portion is of such a length that when it is screwed on the head 7 that its open end will join with the faced off end 29 of tube 1 and form a smooth continuation thereof. A series of small holes 32 are bored in the circumference of the shell and a larger hole 33 in its inclosed end. It is evident that if the shell or electrode end of the complete tube is immersed in water to the junction of the shell 3 and tube 1 that water will enter the shell 3 through the holes 32 and 33 and will make electrical contact between the electrodes 22, 23 and 24 and that if the tube be rapidly lifted out and into the water that the holes 32 and 33 can be so proportioned that the shell 3 will hold sufficient water for a few seconds to insure contact between the electrodes. This slow acting feature is designed to prevent a rapid making and breaking between the electrodes and the water due to the slushing of the water in the boilers of locomotive and marine vessels. But, if the water in the boiler slowly recedes, as when being converted into steam, the water in the shell 3 will recede with it and contact will be broken between the electrodes. The small metal tubes 13, 14 and 15 embedded in the insulating core 4 are staggered or unequally spaced, as shown in end view of Fig. 2, and maintain the same relative spacing throughout their entire length.

The combination plug and union 35, Fig. 5, consists of two of the three parts making up an ordinary pipe union, to-wit: the female lock nut 36 and the shoulder member 37 having either male or female threads on its extending portion to connect to a pipe or conduit. Within the shouldered member 37 is a plug 38 of the same insulating material as the core 4 having embedded therein the metal plugs 39, 40 and 41 having their face ends turned to such a size and so staggered that they will accurately fit into the open ends of the tubes 13, 14 and 15 embedded in the core 4. The inner ends of the plugs 39, 40 and 41 extend beyond the plug 38 and are bored out to form terminal means for connecting wires. When the plugs 39, 40 and 41 are inserted into their respective tubes 13, 14 and 15 in the end of the core 4 and the female lock nut 36 is screwed on the extending portion 34 of tube 2, it is evident that a rigid and permanent metallic and electrical connection will be secured between the tubes 13, 14 and 15 and the plugs 39, 40 and 41 and that they can be separated and again connected without disturbing the relation existing between the electrodes 22, 23 and 24 and the wires connecting to plugs 39, 40 and 41. The asymmetrical arrangement of the conducting tubes 13—14 and 15 in the core 4, and of the plugs 39, 40 and 41 of the union 35, insure proper electrical reconnection when the union 35 is disconnected from the extending portion 34 of inner tube 2.

As all types of steam boilers vary in their size and design, the electrode tubes will have to be of various lengths to insure the immersing of the electrode end to the proper depth in each boiler. It is evident, from the description and illustrations of the complete electrode tube, Figs. 1, 2, 3 and 4, that it can be made of a certain standard length, equal to the greatest depth to which the electrodes will be immersed in the largest type of boiler. To reduce its total length the outer tube 1 is unscrewed from the inner tube 2 and the end at 29 cut off the required distance and the recess 30 again cut therein. It is then screwed back on the tube 2 and the protruding end 34 of tube 2 is also cut off leaving only a sufficient length to properly engage the lock nut 36 of the union 35. As the tubes 13, 14 and 15 in the core 4 are relatively spaced they will again fit the plugs 39, 40 and 41 in the combination plug and union 35.

An electrode tube designed as above described is very flexible in its application, can be made in standard sizes and designs and be altered to suit each local requirement at a minimum of cost and labor. It is easily installed and removed and the electrodes are always accessible for cleaning or repairs by removing the shell 3. It can be made with a varying number of electrodes without altering the standard design by shortening or lengthening the member 12 of core 4 and installing the required number of electrodes thereon, each having connecting wires and tubes embedded in the core and corresponding plug connections in the union plug.

What I claim is:

1. An electrode means for low water indicators, consisting of a rod of insulating material having an enlarged portion and having an extension beyond said enlarged portion, electrodes mounted on said extension, a metal tube surrounding said insulating rod and making a tight joint with said enlarged portion thereof, and having an elongated screw threaded shank and an annular shoulder, and an outer tube screwing on said shank and making a tight joint with said shoulder and provided with external means for attachment to a support.

2. An electrode means for water level indicating apparatus, comprising an elongated outer tubular member having an enlarged head externally screw-threaded for mounting the same in a suitable support, and having an internal screw-threaded bore extending throughout its entire length, and an inner tubular member having an enlarged head externally screw-threaded and a shoulder engaging the inner end of said outer tubular member and having an elongated shank externally screw-threaded to engage the internal screw thread in said outer tubular member throughout the length of said outer tubular member and projecting beyond said outer tubular member, and a perforated tubular shell closed at one end and internally screw-threaded for a portion of its open end and adapted to engage and screw onto the said enlarged externally screw-threaded head of the inner tubular member to the full length of said enlarged head and said shell having its open end faced off to form a joint with the end of said outer tubular member and form a smooth continuation therewith.

3. An electrode means for water level indicating apparatus, comprising an elongated outer tubular member having an enlarged head externally screw-threaded for mounting the same in a suitable support, and having an internal screw-threaded bore extending throughout its entire length, and an inner tubular member having an enlarged head externally screw threaded and a shoulder engaging the inner end of said outer tubular member and having an elongated shank externally screw-threaded to engage the internal screw thread in said outer tubular member throughout the length of said outer tubular member and projecting beyond said outer tubular member, and said inner tubular member having a bore extending throughout its length and said bore being enlarged and channeled within the said enlarged externally screw-threaded head, and an insulating member, extending within said bore the entire length thereof and said insulating member having an enlarged head extending within said enlarged and channeled bore and making a tight fit therewith, and a projecting portion of said insulating member extending beyond said enlarged head, electrically insulated electrodes mounted on said projecting portion of said insulating member, and a perforated tubular shell closed at one end and internally screw-threaded for a portion of its open end to engage with and screw onto the said enlarged externally screw-threaded head of said inner tubular member to the full length of said enlarged head, and said shell having its open end faced off to form a joint with the end of said outer tubular member and form a smooth continuation therewith.

4. An electrode means for water level indicating apparatus, comprising an outer tubular member having an enlarged head externally screw-threaded for mounting the same in a suitable support, and having an internal screw threaded bore extending throughout its entire length, and an inner tubular member externally screw-threaded and having an enlarged head externally screw-threaded and a bore containing a rod of insulating material extending the full length of said inner tubular member, and a projecting portion of said insulating member extending beyond said enlarged head of said inner tubular member and electrically insulated electrodes mounted on said extending portion of said insulating member and said electrodes being electrically connected to asymmetrically arranged connector means integrally embedded in said insulating member, and a perforated tubular shell closed at one end and internally screw-threaded for a portion of its open end to engage with and screw onto said enlarged externally screw-threaded head of said inner tubular member to the full length thereof, and restricted openings in the periphery of said shell and in the closed end thereof to retain the water within said shell and in contact with said electrodes for a predetermined time interval during momentary fluctuations of the water level in which the electrode means are immersed.

5. An electrode means for water level indicating apparatus, comprising an elongated outer tubular member having an enlarged head externally screw threaded for mounting the same in a suitable support, and having an internal screw threaded bore extending throughout its length, and an inner tubular member having an enlarged head with a shoulder engaging the inner end of said outer tubular member and having an elongated shank externally screw threaded to engage the internal screw thread in said outer tubular member throughout the length of said outer tubular member and projecting beyond said outer tubular member an insulating member extending within said inner tubular member the entire length thereof and making a tight fit therewith and having a portion projecting beyond the enlarged head on the inner tubular member, electrodes mounted on said projecting portion of said insulating member, conductors connected to said electrodes and extending within said projecting portion and within the said insulating member, and conducting tubes connected to said conductors and extending therefrom to the outer end of the outer tubular member for reception of connecting plug means, whereby the length of the electrode means and the positioning of the electrodes may be varied while maintaining the connecting effectiveness of said conducting tubes, as set forth.

6. An electrode means, according to claim 5, wherein said conducting tubes are asymmetrically arranged with relation to the axis of the device for insuring proper connection with corresponding plug contacts.

In testimony whereof I have hereunto subscribed my name this 4th day of October, 1919.

WALTER D. NICKUM.